US008861568B2

(12) United States Patent
Petersen

(10) Patent No.: US 8,861,568 B2
(45) Date of Patent: Oct. 14, 2014

(54) CHIRP RECEIVER UTILIZING PHASE PROCESSED CHIRP SIGNALS

(75) Inventor: James L. Petersen, Calgary (CA)

(73) Assignee: NovAtel Inc., Calgary (CA)

( * ) Notice: Subject to any disclaimer, the term of this patent is extended or adjusted under 35 U.S.C. 154(b) by 311 days.

(21) Appl. No.: 13/301,877

(22) Filed: Nov. 22, 2011

(65) Prior Publication Data

US 2013/0129026 A1 May 23, 2013

(51) Int. Cl.
*H04B 1/00* (2006.01)
*G01S 11/08* (2006.01)

(52) U.S. Cl.
CPC ..................................... *G01S 11/08* (2013.01)
USPC ......................................................... 375/139

(58) Field of Classification Search
CPC ............ G01S 13/00; H04B 1/00; H04B 1/69; H04B 17/00; H04L 7/00; H04L 27/00; H04M 11/04
USPC ......... 375/139, 146, 147, 226, 299, 316, 343, 375/371; 455/404.2, 4.2, 5.1, 71; 370/203, 370/210, 484; 342/21, 357.27, 357.44
See application file for complete search history.

(56) References Cited

U.S. PATENT DOCUMENTS

| 4,280,203 | A |  | 7/1981 | Gilmour |  |
| 4,633,185 | A |  | 12/1986 | McPherson |  |
| 6,091,932 | A | * | 7/2000 | Langlais | 725/111 |
| 7,068,704 | B1 |  | 6/2006 | Orr |  |
| 7,110,432 | B2 | * | 9/2006 | Hooton | 375/139 |
| 2006/0140249 | A1 |  | 6/2006 | Kohno |  |
| 2008/0046185 | A1 |  | 2/2008 | Niebauer et al. |  |
| 2008/0165833 | A1 | * | 7/2008 | Lee | 375/139 |
| 2008/0309543 | A1 | * | 12/2008 | Schaffner | 342/21 |
| 2012/0269233 | A1 | * | 10/2012 | Hiscock | 375/139 |
| 2012/0307871 | A1 |  | 12/2012 | Schaffner |  |
| 2013/0051433 | A1 | * | 2/2013 | Hiscock | 375/139 |

FOREIGN PATENT DOCUMENTS

WO    WO 2007/008255    1/2007

* cited by examiner

*Primary Examiner* — Jaison Joseph
*Assistant Examiner* — Shawkat M Ali
(74) *Attorney, Agent, or Firm* — Cesari and McKenna, LLP; Patricia A. Sheehan

(57) ABSTRACT

A chirp receiver processes broadcast chirp signals in the frequency domain to distinguish direct path signals from multipath signals. The receiver processes received chirp signals consisting of respective pulsed frequency sweeps by combining the signals with a synchronized local chirp signal and phase adjusting and concatenating the results over multiple sweeps based on estimated clock phase errors and expected phase rotations of the direct path signals, and produces a sine wave. The phase adjustment and concatenation allows the use of longer Fast Fourier Transforms, which provide increased accuracy of frequency estimation and separate component signals that are very close in frequency. The frequency corresponding to the direct path signal is identified by the lowest frequency bin in which power is above a predetermined noise threshold. The receiver then determines a time delay based on the identified frequency and uses the time delay to calculate accurate clock phase error and position.

17 Claims, 5 Drawing Sheets

CHIRP RECEIVER UTILIZING PHASE PROCESSED CHIRP SIGNALS

BACKGROUND OF THE INVENTION

1. Field of the Invention

This invention relates generally to a ranging receiver and more particularly to a ranging receiver that utilizes chirp ranging signals.

2. Background Information

Ranging systems are used to determine the location or global position of one or more objects relative to one or more transmitters. Radar systems and Global Navigation Satellite Systems (GNSS) are two examples of well known ranging systems.

GNSS receivers determine their global positions based on the time delays associated with code and carrier signals they receive from associated satellites. The GNSS receivers operate in known manners to align locally generated versions of the codes and carriers with the received signal based on correlation measurements. The GNSS receivers then determine the time delay between the known transmission time of the signal and the time of the receipt of the signal based on the phases of the local codes and carriers, and calculate pseudoranges to the respective satellites based on the associated time delays. A global position is determined in a known manner using the pseudoranges to three or more satellites. A given pseudorange is computed from the difference between the presumed time of code transmission by the satellite and the time of receipt of the code at the receiver, multiplied by the speed of light. The pseudorange value thus contains the actual physical range to the satellite in addition to the clock errors at both the satellite and receiver. In GNSS systems, operators of ground control networks continually estimate the clock drifts of the satellites and provide these data to the receivers as part of real time kinematic (RTK) or other broadcast data messages. Further, the GNSS receiver processing software operating in a known manner can compute the position of the receiver as well as the receiver clock errors, provided the receiver has sufficient numbers of measurements, and the calculated position is thus corrected for both satellite and receiver clock errors.

The receiver receives not only line-of-sight, or direct path, satellite signals but also multipath signals that are reflected to the receiver from the ground, bodies of water, nearby buildings, and so forth. The multipath signals, which arrive at the receiver slightly later than the direct-path signal, combine with the direct-path signal to produce a distorted received signal. The distortion of the received signal adversely affects code and, to lesser degree, carrier alignment operations since the correlation measurements are made using the received signal—including the multipath components thereof. The distortion may be such that the receiver attempts to align to a multipath signal instead of the direct-path signal. This is particularly true for multipath signals that arrive at the receiver close in time to the receipt of the corresponding direct path signal.

One way to more accurately align the received and the locally-generated PRN codes is to use the "narrow correlators" discussed in U.S. Pat. Nos. 5,101,416; 5,390,207 and 5,495,499. It has been determined that narrowing the delay spacing between early and late correlation measurements substantially reduces the adverse effects of noise and multipath signal distortion on the early-minus-late measurements. The delay spacing is narrowed such that the noise correlates in the early and late correlation measurements. Also, the narrow correlators are essentially spaced closer to a correlation peak that is associated with the punctual PRN code correlation measurements than the contributions of many of the multipath signals. Accordingly, the early-minus-late correlation measurements made by these correlators are significantly less distorted than they would be if they were made at a greater interval around the peak.

Another way to more accurately align the received and the locally-generated PRN codes is to use a multipath mitigation processing technique that iteratively produces estimates of the direct path signal and one or more of the multipath signals. One such technique is described in U.S. Pat. Nos. 5,615,232 and 6,692,008. Another technique that uses multiple correlators is described in U.S. Pat. No. 5,414,729. Yet another multipath mitigation technique is described in U.S. Pat. No. 7,738,536.

Note that all GNSS methods of multipath mitigation are limited by the broadcast bandwidth of these systems. The limit of the GNSS multipath mitigation techniques to separate a multipath signal from a direct path signal utilizing a 20 MHz broadcast bandwith and signal processing is about 4 meters. In other words, if the multipath signal overlap of the direct path signal is within 4 meters, the mitigation techniques cannot clearly distinguish the direct path signal from the combined signal and a corrupted tracking error may result. It is well known that the use of wider band systems, such as Ultra Wide Band systems that have much wider bandwidths then GNSS, can support multipath mitigation techniques that can discern the difference between the direct signal and the multipath signal when the two are closer together. For example, a system utilizing a 6 GHz Ultra Wide Band signal should theoretically be 300 times more accurate than one utilizing a 20 MHz GNSS signal.

In certain systems pseudolites are utilized to provide additional ranging signals, particularly in environments in which the pseudolites can be placed to essentially avoid certain reflectors, such as particular buildings and so forth, and/or in environments in which portions of the view of the sky may be blocked by buildings and so forth. The pseudolites are ground-based transmitters that transmit ranging signals, such as GNSS-like signals containing PRN codes. The pseudolite signals, like the GNSS signals, are reflected from reflectors that are nearby the antenna, such as the ground, the antenna frame and so forth, and thus, multipath mitigation techniques may be required for the pseudolite signals as well.

The multipath techniques described above work well, and the systems can obtain centimeter accuracies for clock phase measurements in environments in which the multipath signals arrive relatively close in time to the direct path signals, i.e., the multipath signal and the direct path signal are separated by about 4 meters. However, multipath signals that are closer than 4 meters to the direct path signal, that is, multipath signals that received within nanoseconds of the direct path signal, continue to be sources of error. Environments in which such errors may occur are, for example, construction sites in which a GNSS receiver may be in use in an excavation cavity with contours that act as nearby signal reflectors for both GNSS satellite signals and pseudolite signals.

Accordingly, there remains a need for a ranging receiver that can provide for even greater accuracy in situations in which multipath signals arrive at the receiver antenna particularly close in time to the direct path ranging signals.

SUMMARY OF THE INVENTION

A chirp receiver processes broadcast chirp signals in the frequency domain using a Fast Fourier Transform (FFT) to distinguish the direct path signal from the respective multipath signals. The chirp receiver processes the received chirp signals, which consist of respective pulsed frequency sweeps, by combining a received chirp with a synchronized locally generated chirp and phase adjusting and concatenating the results over multiple chirps to produce sine waves. The phase adjustment and concatenation, which is, based on the estimated clock phase differences between the receiver clock and the received chirps, allows for a longer length, and therefore narrower band, FFT that produces high fidelity frequency measurements that distinguish the various signals contained in the composite received signal. The phase adjustment and concatenation thus allows for the separation of multipath signals that are in very close proximity to the direct path signal, with up to a 1 millimeter accuracy.

The frequency corresponding to the direct path signal is identified by the lowest frequency bin in which power is above a predetermined noise threshold. The receiver then determines measurements of clock phase differences between the local clock and the received signal based on the identified frequency. The clock phase differences may be used to calculate the pseudorange to a chirp signal transmitter that is at a known location and using a known clock and frequency source. Alternatively, or in addition, the clock phase differences may be used to transfer accurate time and frequency across a wireless link.

BRIEF DESCRIPTION OF THE DRAWINGS

The present invention can be better understood with reference to the accompanying drawings, of which.

DETAILED DESCRIPTION OF AN ILLUSTRATIVE EMBODIMENT

For ease of explanation, the operations of the system are described first with the co-located GNSS and chirp receivers. The operations are then described for a chirp receiver operating without the co-located GNSS receiver.

Figure 1:
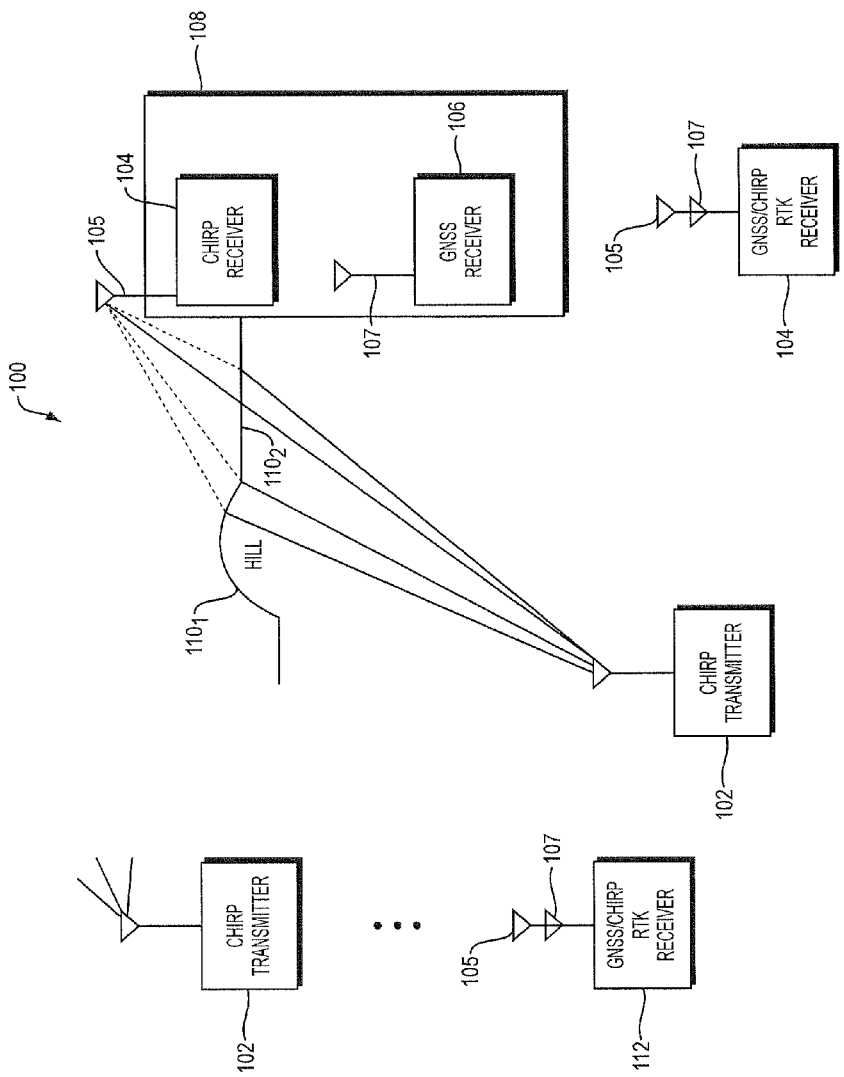
FIG. 1 is a functional block diagram of a system that utilizes a chirp receiver.

Referring to FIG. 1, a ranging system 100 includes one or more chirp transmitters 102 in known locations, a chirp receiver 104 and a GNSS receiver 106 are co-located on a vehicle 108. Additional GNSS receivers (not shown) may be associated with one or more of the chirp signal transmitters, to provide both time synchronization and the locations of the transmitters based on ranging signals transmitted by GNSS satellites. Alternatively, the chirp transmitters 102 may be placed in predetermined locations or be provided with their time and locations and time synchronization signals at the time of placement using GNSS receivers or other devices to determine the time and locations, and thus, GNSS receivers need not be co-located with the chirp transmitters.

However, without the co-locating a method of providing clock synchronization is needed. One method of providing the clock synchronization is to monitor respective free running chirp transmitters 102 using a chirp receiver that is connected to a known clock and frequency source, and then broadcast transmitter clock offset and chirp rate terms to the chirp receiver 108 over a communication link. This method is similar to GNSS RTK in which a base GNSS receiver at a known location broadcasts information relating to GNSS satellite clock drift, and the GNSS receivers utilize the information in a well known manner to achieve centimeter accuracy. A convenient place to monitor the chirp transmitter clocks, as well as the GNSS satellite clocks, is in a combined GNSS and chirp RTK reference receiver 112.

The chirp receiver 104 includes an antenna 105 for receiving the chirp signals broadcast by the chirp transmitters 102. The GNSS receiver 106 includes an antenna 107 for receiving the GNSS satellite signals. As shown, one or more reflectors $110_i$, such as a hill $110_1$ and the ground $110_2$, reflect the ranging signals (solid line) as multipath signals (dotted lines) to the antennas 105 and 107 of the chirp receiver 104 and the GNSS receiver 106, respectively. The GNSS receiver 106 operates in a known manner to determine an estimated position of the vehicle 108, using the signals transmitted by GNSS satellites 120 and as appropriate the GNSS RTK information. The chirp receiver 104 operates, as discussed below with reference to FIGS. 3-5, to determine very accurate clock phase differences between the received chirp signal and a local clock, and thus, the associated time delay. The chirp antenna 105 and GNSS antenna 107 may be co-located. If separated on the vehicle 108, care must be taken to account for the orientation and separation difference between the antennas when computing a position based on measurements from both GNSS and chirp signals.

Figure 2:
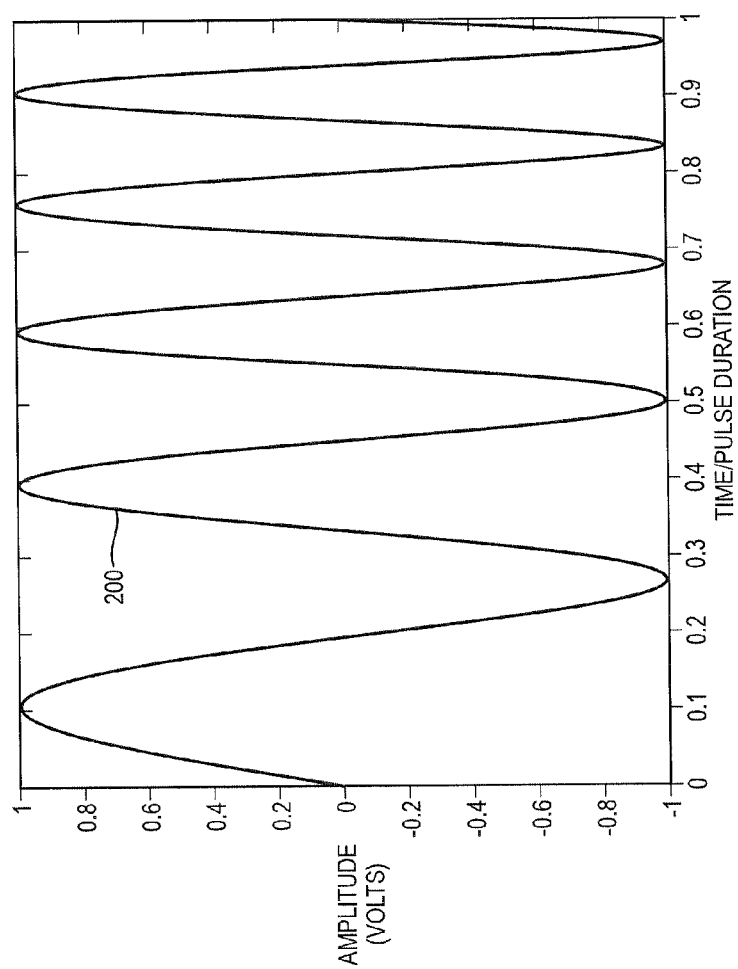
FIG. 2 is an illustration of a chirp signal transmitted by a chirp transmitter of FIG. 1.

Referring now also to FIG. 2, the chirp transmitters 102, at predetermined transmission times, transmit ultra wide band chirp radio frequency (RF) signals. One form of which is shown as curve 200. In the example, the predetermined times are based on GPS time, though the predetermined times may be based on any distributed clock. Each chirp transmitter 102 is assigned a predetermined time slot, or time offset, from the GPS or other transmission time, so that the chirp receiver 104 can distinguish the signals from the respective transmitters.

A chirp RF signal is a swept frequency signal that is generated in a pulsed fashion. Each pulse consists of one or more frequency sweeps across the operating bandwidth. In some cases, pulse-shaping may be applied to the pulses before transmission, to reduce spectral emissions. The direction of the sweep can be up or down or, for multiple sweeps in the same pulse, an arbitrary mixture of up and down.

The manner in which the frequency changes with time can follow different function shapes such as linear, arc tangent, logarithmic etc. FIG. 2 illustrates a linear sweep. If a sweep other than a linear sweep is utilized in the system 100, the inverse of the function is applied to the received chirp signal, in order to produce an end-to-end linear sweep. The advantage of an end-to-end linear sweep is that a delay in a received signal translates directly to a frequency and a phase shift.

A transmitted chirp signal x(t) is represented by the following equation:

$$x(t) = \cos(2\pi \int_0^t f(\tau) d\tau) \qquad \text{Eqn. 1}$$

for a linear chirp, $$f(\tau) = f_0 + \frac{\Delta f}{T_{sweep}} \tau = f_0 + k\tau \qquad \text{Eqn. 2}$$

Substituting eqn. 2 into eqn. 1 and performing the integration:

$$x(t) = \cos\left(2\pi\left(f_0 + \frac{k}{2}t\right)t\right) = \cos(\phi(t)) = \frac{(e^{j\phi(t)} + e^{-j\phi(t)})}{2} \quad \text{Eqn. 3}$$

To determine the time delay of a received chirp signal, the received chirp signal is combined with a locally-generated single-sideband version of the chirp signal:

$$\begin{aligned} y(t) &= x(t - t_d) 2 e^{j\phi(t)} \quad \text{Eqn. 4} \\ &= \frac{(e^{j\phi(t-t_d)} + e^{-j\phi(t-t_d)})}{2} 2 e^{j\phi(t)} \\ &= e^{j(\phi(t)+\phi(t-t_d))} + e^{j(\phi(t)-\phi(t-t_d))} \end{aligned}$$

After low pass filtering, the combined signal y(t) is represented by the following equation:

$$y(t) = e^{j(\phi(t)-\phi(t-t_d))} = e^{j\left(kt_d f_0 t_d - \frac{k}{2}t_d^2\right)} \approx e^{j(kt_d t + f_0 t_d)} \quad \text{Eqn. 5}$$

where $t_d$ is the delay between signal transmission and receipt, and the subtracted $t_d^2$ term is, for typical values of $t_d$, negligible.

Note that Eqn. 5 contains a constant frequency defined by $kt_d$ and a constant phase shift defined by $f_0 t_d$. Accordingly, both the phase and the frequency of the received signal convey information about the time delay $t_d$ between the transmission of the signal and the receipt of the signal. As discussed in more detail below, the frequency is utilized in the system 100 to determine the time delay of the direct path signal component of the received chirp signal and the phase is used to concatenate the signal samples for processing.

Figure 3:
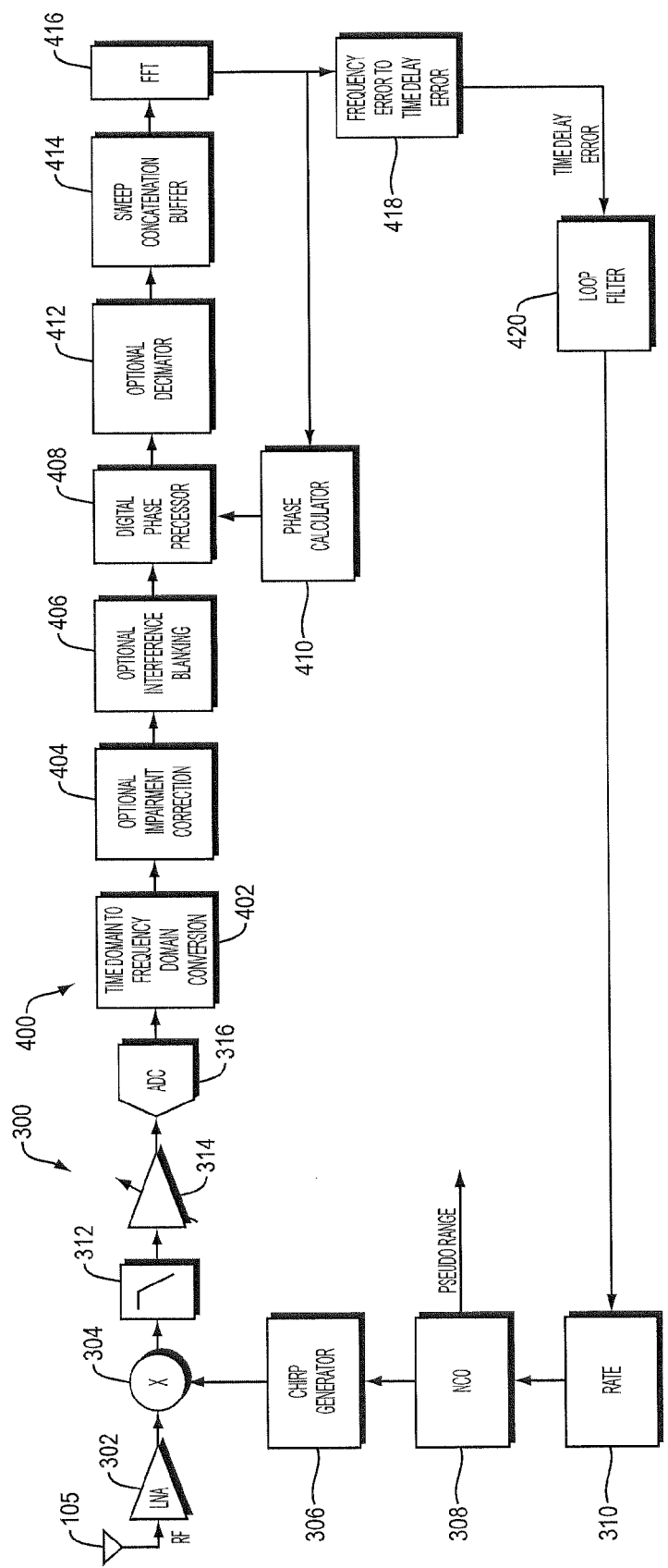
FIG. 3 is a more detailed functional block diagram of the chirp receiver of FIG. 1.

Referring now to FIGS. 1 and 3, the chip receiver 104 includes an RF front end 300 that processes the received chirps, which consist of the direct path chirp signal and corresponding multipath signals and is thus a composite signal provided by the antenna 105. The receiver 104 first amplifies the received signal in a low noise amplifier (LNA) 302, in order to reduce the adverse effects of the noise contributed by the down-stream components. The LNA 302 has a sufficiently high third order intercept point (IP3), to accommodate the power of the received composite signal without introducing significant distortion.

The chirp signal is next provided to a complex mixer 304 that mixes the signal with a locally generated chirp signal provided by a chirp generator 306, which is discussed in more detail below with reference to FIG. 5.

After mixing, the complex intermediate frequency (IF) signal is provided to a low pass filter 312 and amplifier 314 which essentially attenuate power above the frequencies of interest and bring the signal to a level compatible with the operation of an Analog to Digital converter (ADC) 316. The ADC provides digital samples of the complex IF signal to a digital signal processor (DSP) 400. As appropriate, the low pass filter and amplifier may operate in a known manner to provide variable gain, to accommodate an ADC with a lower dynamic range that may otherwise adversely affect the conversion of the signals at the extremes of the incoming signal power.

The various operations of the DSP 400 are discussed below. For ease of explanation, the operations are referred to and referenced in the drawing as processing blocks.

The sample signals provided by the ADC 316, which are time domain signals, are supplied to a time domain to frequency domain conversion block 402, which operates in a known manner to provide equivalent signals for processing in the frequency domain.

Figure 4:
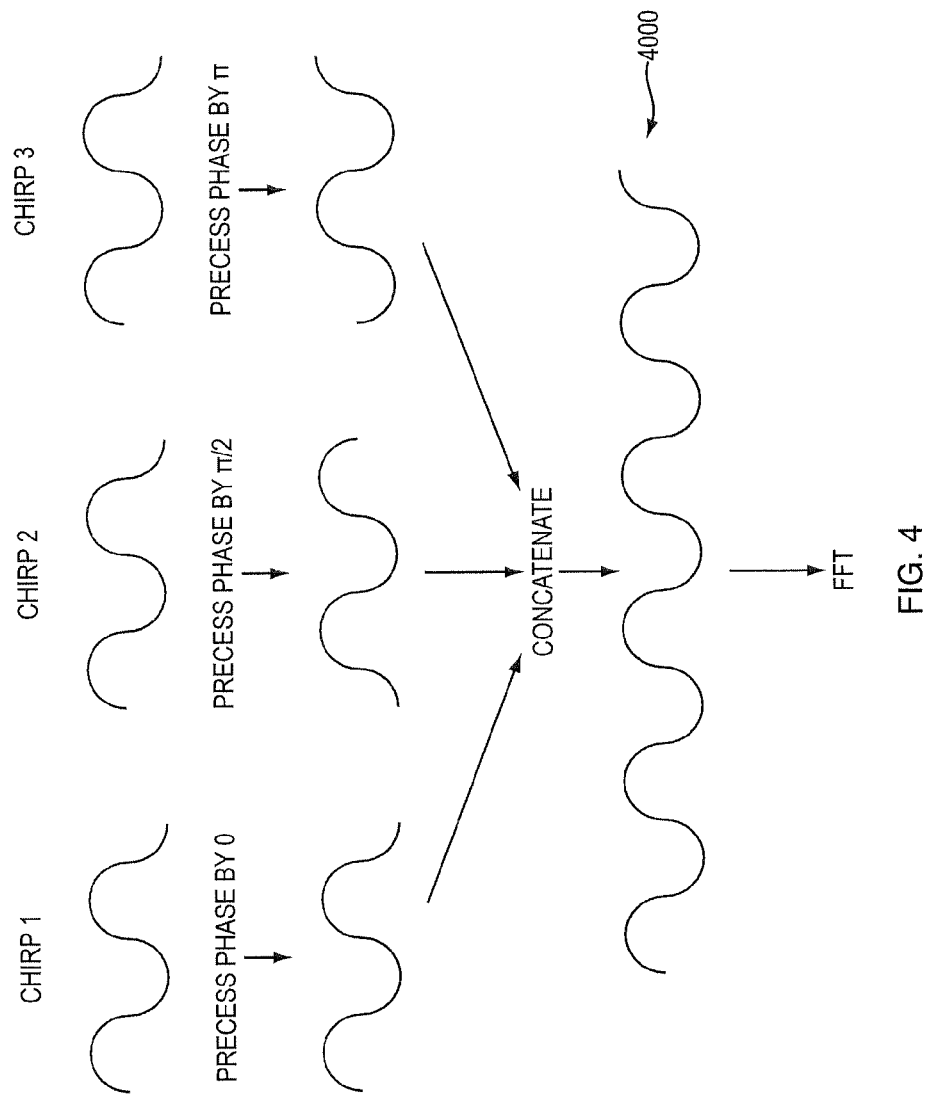
FIG. 4 illustrates phase precessing performed by the chirp receiver of FIG. 1.

A phase precessor block 408 adjusts the phases of the samples corresponding to respective chirps in accordance with phase information provided by a phase calculator 410, to essentially enforce a continuity of the pulsed signal being tracked. The phase precessor block adjusts the starting phases of the samples corresponding to respective chirps in small phase increments so that a continuous sinusoidal signal is produced during the course of a measurement epoch and the edges of adjacent chirps align. This is referred to hereinafter also as "phase stitching." An example is illustrated in FIG. 4, in which samples corresponding to chirps 2 and 3 are phase adjusted by π/2 and π respectively, and are then concatenated with the samples of chirp 1, to form a sine wave 4000. The phase adjusted and concatenated signals are then provided to an FFT block 416 for processing.

Briefly, the phase precessor 408 adjusts the phase of, for example, a sample taken at ½ cycle of a second chirp to a phase corresponding to 1½ cycles of the first chirp, and the chirp signal samples are then concatenated and appear to an FFT block 416 as continuous sweeps or sinusoidal cycles. The phase calculator 410 determines the adjustments based on the expected phase of the direct path signal, which is, in turn, based on phase information associated with an estimated range or, in the example with co-location with a GNSS receiver, the known GNSS position of the chirp receiver, as well as clock phase error estimates provided by the FFT block 416. As appropriate, movement or trajectory information from inertial or other movement sensors (not shown) are also utilized. The operation of the phase calculator 410 is discussed in more detail below.

The phase precessed signals are held in a buffer 414 that allows the signal samples to be concatenated, or phase stitched, over multiple chirps in order to create a sufficient number of signal samples that can be processed as if they are continuous for a longer length. It is well known that an FFT will produce higher fidelity frequency measurements with longer length data sample sets. A swinging buffer may be used to allow samples to be loaded at one end of the buffer while the FFT processing block 416 takes data from an opposite end of the buffer. The length of the buffer is a design choice. However, the length is constrained by the stability of an oscillator 308 and the receiver clock (not shown), since both must be stable over the measurement interval to greater than the accuracy requirement of the measurements.

The FFT block 416 is essentially a bank of matched filters that correlate frequency components of the data to a set of sinusoidal basis functions. A large FFT is used to provide fine frequency resolution associated with the measurement accuracy. It is possible to replace the FFT block 416 with a bank of correlators that operate around the frequency associated with the line-of-sight component of the received signal. As discussed below, the associated frequency is based on the estimated chirp propagation distance, that is, the estimated range, estimated phase offsets, and estimated clock phase errors. The advantage of the FFT block 416 is, however, that the processing provides a better observation of the overall multipath environment and also facilitates coarser quantization of the start times of the locally generated chirps. Further, the processor is easy to implement in an off-the-shelf Field Programmable Gate Array (FPGA).

The FFT is performed on the phase adjusted and concatenated, or phase stitched, signals to estimate the frequency most closely associated with the time delay of the received chirp signal, and determine the clock phase errors between the received chirp signal and the receiver clock. The clock phase errors may be used in the calculations of the pseudorange to the chirp transmitter 102, as discussed below. Alternatively, or in addition, the clock phase errors may be used to provide accurate time over a wireless link.

The chirp signal transmitter 102 is restricted to particular power levels by government regulation, to avoid interference between the ultra wide band chirp signals and the signals transmitted by other nearby transmitters. Accordingly, the chirp receiver 104 averages many measurements, after phase adjustment and concatenation, to produce signals with sufficient power for the FFT processing.

Also, because of power regulations, the broadcast chirp signals are sparse, i.e., there are relatively long periods of time between the transmitted chirp pulses. Accordingly, the phase adjustment and concatenation, or phase stitching, of the signal samples of the respective chirps are based on the calculated phase errors between the received chirp signal and the locally-generated chirp signal, which is driven into synchronism with the received direct path signal. If the local generator is not in synchronism, the phase stitching is based on the expected phase differences corresponding to the estimated range and clock offset estimates. The frequencies and phases of the multipath components of the received signal differ from those of the direct path component, because the multipath signals arrive later in time that the direct path signals. Accordingly, the components of the multipath signals phase stitch and average sub-optimally.

The FFT of the phase stitched and averaged signals in FFT block 416 thus results in relatively high power in the bin corresponding to the frequency associated with the time delay of the direct path component and lower power in the frequency bins that correspond to the delays of the respective multipath signals. The frequency bins may correspond to delay times equal to ½ millimeter of distance. Since the multipath signals always arrive later than the direct path signals, the direct path signal is discernable in the lowest frequency bin in which the power is above a predetermined minimum threshold associated with noise. Notably, the bin associated with the direct path signal should also have significantly higher power than the adjacent higher frequency bins, which are associated with the multipath signals. In cases where the delay between the receipt of the direct path signal and the multipath signal is very small, interpolation may be performed between adjacent bins that each have substantial power, in order to increase resolution.

As discussed, the phase calculator 410 determines a phase adjustment or precession for the samples of the respective chirps in order to phase stitch the chirp samples into sine waves for use in the FFT processing block 416. The chirps 1, 2 and 3 (FIG. 4) are separated in time and the phase calculator determines the expected phase rotations occurring between the respective chirps in order to correctly phase stitch the signal samples from the respective chirps into a continuous sine wave. Accordingly, once the local chirp source is grossly aligned with the received chirp signals, that is, they at least overlap, the receiver may calculate the phase rotations or utilize a look up table of pre-calculated values, to adjust the phases for the phase stitching of the chirps. The phase adjustment values are calculated based on the known chirp rate and the length of the sweep, the start and end frequencies of the sweep, and as appropriate the estimated range and the estimated clock phase errors as determined by the FFT block 416. As necessary, the calculations include the sensed movements of the vehicle 108, as measured by local inertial or other sensors (not shown).

More specifically, coarse acquisition can be achieved by using a low-resolution FFT with a time duration approximately equal to the sweep duration. The start time of the receiver chirp is adjusted until an acceptable frequency is detected by the FFT. Also, as long as the receiver is not moving, multiple samples can be coherently summed to improve the signal to noise ratio. Once an overlap between the received chirp and the locally generated chirp is determined, a coarse frequency and phase can then be extracted from the FFT.

Once this is done, the FFT resolution can be doubled by adjusting the phase of the next sweep, in the example, a second sweep, so that the second sweep can be concatenated with the first sweep to form the longer duration time sequence required for the higher resolution FFT. With no movement, the phase adjustment to concatenate the sweeps is calculated from the length and frequency of the sweep. The phase adjustment is the phase increment required to make the starting phase of the second sweep the same as the ending phase of the first sweep, to produce a continuous sinusoidal signal. As additional sweeps are concatenated into the sinusoidal signal, the resolution of the FFT can increase, and better frequency resolution and phase can be determined. This process can be repeated until the necessary resolution is obtained.

The estimated range, or pseudorange, along with the estimated clock offsets could assist the initial acquisition by predicting when the chirps will arrive at the receiver, and the search space can thus be narrowed. Without the estimations, the receiver must test all possible phase offsets with respect to the transmit pattern in order to determine an overlap between the received chirp and the locally generated chirp. After acquisition and in steady state tracking, the numerically controlled oscillator ("NCO") 308 of the chirp tracking loop 422 estimates the pseudorange directly so the theoretical or estimated range is not as useful.

If the estimated range has a rate to it, that is, if the receiver is moving or one of the clocks is drifting, the estimated pseudorange and pseudorange-rate could both be used to help narrow the search space.

The system may also utilize a table of pre-calculated phase adjustments associated with various clock phase errors. The table is entered using the identified frequency, and the phase calculator utilizes the values from the table along with the expected phase adjustment associated with the estimate range and the predetermined clock offset, to determine the phase adjustments for the signal samples of the respective chirps. If the receiver is stationary, the table may include in the pre-calculated value the phase adjustment associated with the path that the direct signal travels.

Alternatively, the phase calculator 410 may utilize early and late FFTs in addition to the on-time or punctual FFT 416 in a tracking loop. The early FFT adjusts the phase of the samples by, for example 45°, the punctual FFT by 90° and the late FFT by 270°, and the FFTs form a tracking loop that tracks the phase rotations. Thus, the phase calculator 410 adjusts the rotations for the early, punctual and late FFT's to drive the punctual FFT toward a predetermined offset frequency. The differences in phase offsets between the FFTs are narrowed as power in the punctual FFT is driven closer to the offset frequency.

The results of the early, punctual, and late power differences are thus used to adjust the "phase stitching" of the wavelets corresponding to the chirp pulses. If more power is seen in the Early FFT estimate, the "phase stitching" tracking loop reduces the amount of phase rotation applied to the chirp signal samples. Likewise, if there is more power received in the Late FFT estimate, then the "phase stitching" tracking loop increases the amount of phase rotation applied to the chirp signal samples, and so forth, until the Punctual FFT contains the highest power value and the Early and Late FFT power values about the same.

Once the FFT tracking loop is synchronized to the direct path signal, each chirp should stitch perfectly with the previous and next chirps to form a sine wave associated with the frequency of the direct path signal. This "stitching correction" is only optimal for a very narrow band of frequencies. Other frequencies received in the signal, for example, from multipath signals, will not stitch together as optimally as the direct path signal and so will have reduced power readings from the FFT.

The results of the FFT processing or, as appropriate, the punctual FFT are provided to a frequency error-to-time delay error translator block 418, which drives a rate block 310 that, in turn, adjusts the NCO 308 to drive the local chirp generator 306 into synchronism with the received chirp signal. Alternatively, the phase of the locally generated chirp may be shifted to realign the FFT output instead of adjusting the chirp rate.

The frequency error-to-time delay error block 418 is thus part of a chirp tracking loop 422 that adjusts the local chirps based on the FFT measured frequency associated with the direct path signal. To take the best advantage of the FFT processing 416, a predetermined offset is used between the local and the received chirps, such that the result of the FFT will be the predetermined offset frequency when the local chirp generator is synchronized to the received chirps. However, producing the IF signal with a local chirp that is offset by the predetermined amount results in a small loss of signal at the end of the sweep, due to the fact that the transmitter completes the sweep before the receiver does.

The receiver's chirp may instead be offset in frequency by a predetermined amount such that the two chirps overlap completely when tracking, with no loss of power yet providing an offset frequency. If an observed frequency shift occurs, for example, a lower frequency than the offset frequency is observed, the locally generated pulses are slowed down slightly by the NCO 308 to re-align the frequency to the offset frequency. Conversely, if a higher frequency is observed in the FFT output, the locally generated chirps are sped up by the NCO 308 to realign the FFT output frequency to the offset frequency.

When the FFT processing indicates that the chirp generator 306 is in synchronism with the received chirp signal, the NCO represents the broadcast phase of the received chirp signal at any point in time. Accordingly, phase measurements of the NCO are taken periodically, for example, every 1 second in synchronism with a local 1PPS strobe associated with the receiver's time clock. The differences between the NCO phase measurements and the local time, e.g., the 1 PPS in the example, and are then multiplied by the speed of light to determine pseudoranges to the chirp transmitter, in order to further derive position, time or clock offset information.

If the approximate clock phase offset between the transmitter and the receiver cannot be estimated at start-up, if for example there is no GNSS receiver 106 at the location of the chirp receiver 104 and the position of the receiver is not yet known, a search procedure as is well known in the art is necessary to grossly align the received chirp with the locally generated chirp. The receiver thus varies the rate of the chirp generator and utilizes the results of the FFT to determine when the local chirp at least overlaps with the received chirp based on the FFT power. Once the received chirps and locally generated chirps have at least some overlap, FFT processing 416 is used to more accurately bring the local chirp generator into synchronization with the received chirps as discussed above.

In addition to the above-described components, the DSP 400 may also implement an optional impairment correction block 404, to correct for group delay distortion of input filters, amplifiers and other RF components, and/or amplitude distortion of the amplifiers and other RF components and/or an I/Q imbalance, if I/Q mixing is done in the analog domain. The correction values may, for example, be determined during calibration operations at the manufacturer and stored in the DSP.

The DSP 400 may also implement an optional interference blanking block 406, to isolate the frequencies that have higher than expected power levels. To prevent the samples from corrupting the measurements, the block either blanks the corresponding samples or substitutes an interpolated waveform for the samples.

A decimator block 412 operates in a known manner to reduce the sampling rate while preventing aliasing of noise and other higher frequency interference from corrupting the signal in the desired bandwidth. In addition, while the phase precessing is shown by block 408, the operation may instead occur at one or more other locations in the processing and may include a phase precessing component in the RF processing.

Advantageously, a chirp receiver operating as discussed above is able to determine the time delay for a direct path component of the received chirp signal in the frequency domain by processing multiple chirps, phase stitching the results based on the frequency and/or phase differences as measured between the received chirp and the receiver clock and performing an FFT. The receiver can then precisely determine the phase relationship between the transmitted chirp and the receiver clock based on the calculated the time delays.

Figure 5:
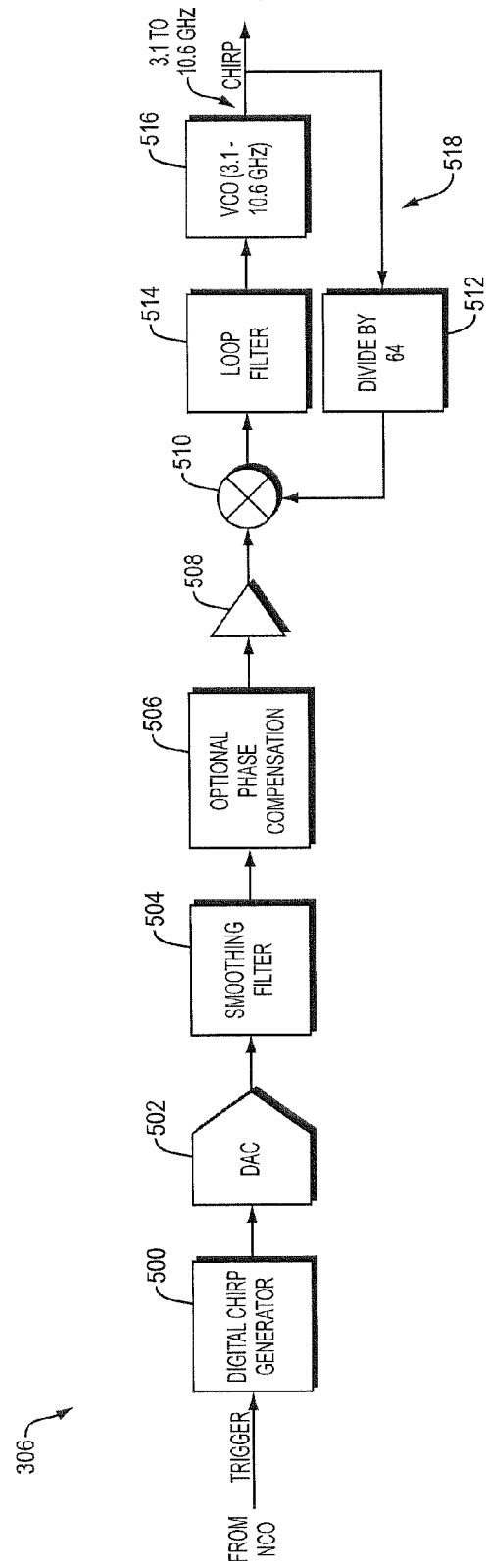
FIG. 5 is a more detailed functional block diagram of a chirp generator of the receiver of FIG. 3.

Referring now to FIG. 5, the chirp source 306 is illustrated in more detail. A direct digital synthesis (DSS) device 500 generates a reference signal which is then multiplied up in frequency by a wide band phase lock loop 518 to drive a voltage controlled oscillator (VCO) 516, which produces the chirp, or sweep, signal while maintaining accuracy in the generated frequencies and sweep trajectories. In the example, the reference signal sweeps between 88 MHz and 160 MHz and the PLL 518 multiplies the sweeps up in frequency by 64 to 3.1 to 10.6 GHz. The chirp generator 306 further includes a digital to analog converter (DAC) 502, a smoothing filter 504 and an amplifier 508 that together condition the signal produced by the DSS 500 before the signal is mixed with the output of the PLL 518. The PLL includes a loop filter 514 that smoothes the results and the VCO 516, which responds to the signal from the loop filter and produces the desired frequency sweep. Alternatively, other known devices may be utilized to produce the chirp signal.

An optimal phase compensation block 506 may be included between the filter 504 and the amplifier 508, such that the phase of the chirp can be adjusted to drive the local chirps to synchronism with the received chirps.

The chirp source 306 may also include delays (not shown) to generate early, on-time/punctual and late versions of the chirp signal, as appropriate.

The RF front end 300 of the chirp receiver 104 may instead utilize a baseband signal and analog I/Q mixing, which requires separate I and Q ADCs, filters and gain components per channel.

While a single channel is shown, multiple channels may be utilized to process signals received from multiple chirp signal transmitters 102. Alternatively, the multiple channels may be utilized to speed up the processing of the signals received from a single chirp signal transmitter.

The foregoing description has been directed to specific embodiments of the invention. It will be apparent, however, that other variations and modifications may be made to the described embodiments, with the attainment of some or all of the advantages of such. For example, the processing blocks described as operations performed by a DSP may be performed by one or more processors, by software, hardware, firmware or combinations thereof. An additional phase precessor may operate on analog signals or be included in the chirp signal source and operate in conjunction with the DSS, to provide continuity with the digital phase precessor block operating also to further align the sweep samples. Accordingly, this description is to be taken only by way of example and not to otherwise limit the scope of the invention. Therefore, it is the object of the appended claims to cover all such variations and modifications as come within the true spirit and scope of the invention.

What is claimed is:

1. A method of measuring clock phase error comprising: receiving, at a chirp receiver, a chirp signal consisting of a plurality of chirps that are pulsed frequency sweeps transmitted by a chirp transmitter; mixing the received chirp signal with a locally generated chirp signal that is driven into synchronism with the received chirp signal; adjusting samples of the mixed signals corresponding to multiple sweeps based on estimated clock phases and expected phase rotations of direct path signal components of the respective received chirps to align edges of adjacent chirps and concatenating the samples to produce a sinusoidal signal over a measurement epoch; processing the concatenated samples in a frequency domain and determining a frequency corresponding to a direct path signal component as the lowest frequency associated with power above a predetermined threshold; calculating a time delay associated with the lowest frequency determined for the direct path signal component and determining a clock phase error between a receiver clock and the received signal.

2. The method of claim 1, wherein the locally generated chirp signal is generated by a direct digital synthesis device.

3. The method of claim 1, wherein processing in the frequency domain consists of a Fast Fourier Transform (FFT).

4. The method of claim 3 further including altering starting phases of the samples from respective sweeps to provide a continuous sinusoidal signal for FFT processing.

5. The method of claim 4, wherein the time delay of the direct path signal component is determined by interpolating between frequencies associated with multiple bins having power above a predetermined threshold.

6. The method of claim 1, wherein the adjusting and concatenation occur by adjusting the phase of the samples based on expected phase rotations between the sweeps, the associated estimated clock phase errors, and propagation delay and rate of change in delay based on an estimated position of the receiver and sensed movement of the receiver.

7. The method of claim 1 further including determining a receiver clock offset from a transmitter clock based on the clock phase error.

8. The method of claim 7 further including determining a range to the receiver based on a transit time and the clock phase error.

9. The method of claim 1 further including computing position and clock components of the receiver with measurements from chirp pseudorange measurements.

10. The method of claim 9 further including a Global Navigation Satellite System (GNSS) receiver co-located with the chirp receiver to determine a global position using signals from a plurality of GNSS satellites.

11. The method of claim 10 wherein the position and clock components of the chirp receiver are computed with measurements from the GNSS receiver and chirp pseudorange measurements.

12. A chirp intercept receiver comprising: an antenna that receives a chirp signal consisting of pulsed frequency sweeps transmitted from a chirp signal transmitter at a known location; a chirp signal source that generates a local version of the chirp signal; a mixer that mixes the received and local versions of the chip signal; and at least one processor configured to: adjust phase samples of the mixed signal over multiple sweeps based on estimated clock phases and expected phase rotations of direct path signal components of respective received chirps to align edges of adjacent chirps and concatenate the samples to produce a sinusoidal signal over a measurement epoch, process the concatenated samples in a frequency domain to determine a frequency associated with a direct signal component of the received chirp signal as the lowest frequency with power above a predetermined threshold, and calculate a phase difference between the received chirp signal and a receiver clock based on a time delay associated with the lowest frequency determined for the direct path chirp signal component.

13. The receiver of claim 12, wherein the at least one processor utilizes phase rotation associated with receiver and transmitter clock phase errors, propagation delay and receiver movement.

14. The receiver of claim 12, wherein the receiver processes the adjusted and concatenated samples using a Fast Fourier Transform (FFT) with frequency bins associated with phase offset between received pulse and local clock of the receiver.

15. The receiver of claim 14, wherein the receiver performs FFT associated with early, punctual and late versions of phase adjusting estimates.

16. The receiver of claim 12 further includes a Global Navigation Satellite System (GNSS) receiver co-located with the chirp receiver to determine a global position using signals from a plurality of GNSS satellites.

17. The method of claim 16 further includes position and clock components of the chirp receiver are computed with measurements from the GNSS receiver and chirp pseudorange measurements.

* * * * *

UNITED STATES PATENT AND TRADEMARK OFFICE
CERTIFICATE OF CORRECTION

| | | |
|---|---|---|
| PATENT NO. | : 8,861,568 B2 | Page 1 of 1 |
| APPLICATION NO. | : 13/301877 | |
| DATED | : October 14, 2014 | |
| INVENTOR(S) | : James L. Petersen | |

It is certified that error appears in the above-identified patent and that said Letters Patent is hereby corrected as shown below:

In the Specification:

In Col. 2, line 20 should read:
broadcast bandwidth and signal processing is about 4 meters.

In Col. 7, line 41 should read:
nals, the direct path signal is discernible in the lowest fre- Signed and Sealed this
Third Day of March, 2015

Michelle K. Lee
*Deputy Director of the United States Patent and Trademark Office*